United States Patent
Galbas et al.

(10) Patent No.: US 9,862,250 B2
(45) Date of Patent: Jan. 9, 2018

(54) METHOD AND DEVICE FOR INFLUENCING A CLIMATE IN THE INTERIOR OF A MOTOR VEHICLE

(71) Applicant: Robert Bosch GmbH, Stuttgart (DE)

(72) Inventors: Roland Galbas, Ludwigsburg (DE); Volker Hofsaess, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/176,906

(22) Filed: Jun. 8, 2016

(65) Prior Publication Data

US 2016/0361971 A1     Dec. 15, 2016

(30) Foreign Application Priority Data

Jun. 11, 2015    (DE) ........................ 10 2015 210 661

(51) Int. Cl.
     *B60K 35/00*      (2006.01)
     *B60K 28/06*      (2006.01)
     *B60H 1/00*       (2006.01)

(52) U.S. Cl.
     CPC ..... *B60H 1/00778* (2013.01); *B60H 1/00764* (2013.01); *B60H 1/00785* (2013.01)

(58) Field of Classification Search
     CPC ............ B60H 1/00778; B60H 1/00657; B60H 1/00785; B60H 1/00735; B60H 1/004; B60L 1/003; G98G 1/167; B60K 35/00; B60K 28/06; B60W 20/00; B60W 10/30
     See application file for complete search history.

(56) References Cited

U.S. PATENT DOCUMENTS

| | | | | |
|---|---|---|---|---|
| 5,934,987 A | * | 8/1999 | Baruschke | B60H 1/00785 165/223 |
| 2006/0124290 A1 | * | 6/2006 | Nonnenmacher | B60H 1/00735 165/202 |
| 2006/0137365 A1 | * | 6/2006 | Jurthe | B60H 1/00735 62/132 |
| 2010/0132388 A1 | * | 6/2010 | Oyobe | B60H 1/004 62/157 |
| 2010/0268412 A1 | * | 10/2010 | Mori | B60W 10/30 701/31.4 |
| 2012/0116608 A1 | * | 5/2012 | Park | B60H 1/00657 701/2 |
| 2012/0130577 A1 | * | 5/2012 | Ichimoto | B60W 20/00 701/22 |
| 2012/0152512 A1 | * | 6/2012 | Mori | B60H 1/00778 165/202 |
| 2013/0079978 A1 | * | 3/2013 | Uyeki | B60H 1/00657 701/36 |
| 2013/0194099 A1 | * | 8/2013 | Nagata | B60K 28/06 340/575 |
| 2014/0114532 A1 | * | 4/2014 | Choi | G08G 1/167 701/36 |

(Continued)

FOREIGN PATENT DOCUMENTS

DE      102013209016      11/2013

*Primary Examiner* — Yuri Kan

(74) *Attorney, Agent, or Firm* — Norton Rose Fulbright US LLP; Gerard Messina

(57) ABSTRACT

A method and device for influencing a climate in the interior of a motor vehicle, the influence occurring at least as a function of one operating state and/or operating behavior of the motor vehicle ascertained before the influence.

12 Claims, 2 Drawing Sheets

(56) References Cited

U.S. PATENT DOCUMENTS

2015/0258998 A1* 9/2015 Kusumi ............... B60L 1/003
  701/22
2016/0303968 A1* 10/2016 Miller ............... B60K 35/00

* cited by examiner

METHOD AND DEVICE FOR INFLUENCING A CLIMATE IN THE INTERIOR OF A MOTOR VEHICLE

CROSS REFERENCE

The present application claims the benefit under 35 U.S.C. §119 of German Patent Application No. DE 102015210661.6 filed on Jun. 11, 2015, which is expressly incorporated herein by reference in its entirety.

FIELD

The present invention relates to a method and a device for motor vehicles for influencing a climate by predictive preconditioning. The attention is focused here on influencing the climate conditions in the interior of the motor vehicle, a role being played by both the climate conditions in the surroundings of the motor vehicle as well as the operating behavior, determined by at least one driver of the motor vehicle.

BACKGROUND INFORMATION

There are already motor vehicles which have an automatic climate control functionality. This includes, for example, an automatic control of an air conditioning/heating unit and/or climate controlled seats for occupants of the motor vehicle.

Methods, systems and vehicles are described in German Patent Application No. DE 10 2013 209 016 A1, in order to provide an adaptive automatic climate control functionality for a vehicle. A method and a system are described, which include, among other things, the initiation of an automatic climate control feature for a vehicle.

SUMMARY

The method and the device according to the present invention influence a climate in the interior of a motor vehicle.

In accordance with the present invention, the influence occurs at least as a function of one operating state and/or operating behavior of the motor vehicle ascertained before the influence.

The present invention has the advantage that it is not necessary for a driver of the motor vehicle to personally plan the influence of the climate and/or set it in the motor vehicle and/or carry it out either at the start of a trip or at an earlier or later point in time. The dependence of the influence on the ascertained operating state and/or the ascertained operating behavior in previous trips causes the climate in the interior of the vehicle to be influenced independently in this regard for a current trip and for future trips. This allows the driver of the motor vehicle to make a speedy departure at the beginning of a trip without having to be concerned beforehand with the climate conditions within the motor vehicle. This in turn results in a gain in time for the driver and is moreover an eco-friendly and/or cost saving alternative, since, for example, in the case of an influence of the climate values induced by the driver, which represent the climate when the motor vehicle is restarted, it is possible to save fuel and/or the available electrical energy when an engine or electric motor is running. An increase in the number of trips by the motor vehicle makes it possible to ascertain more precisely predicted climate values which represent the climate within the vehicle. The conditioning of the motor vehicle according to the present method may also ensure that sensors such as, for example, video sensors, which are attached on and/or in the motor vehicle, also function as intended, resulting in an increase in their reliability and, for example, the confidence of the driver in the sensors of the motor vehicle, specifically those which are responsible for the safety of the driver of the motor vehicle and its surroundings by functioning as intended.

Preferably, the operating state ascertained before the influence occurs as a function of the operating behavior of the motor vehicle.

Preferably, the operating state is ascertained in such a way that the motor vehicle has driving cycles beginning with the start and ending with the shutdown of the motor vehicle. The influence occurs at least as a function of at least one first climate value representing the climate in the interior of a motor vehicle, this first climate value representing the climate in the interior of the motor vehicle during the driving cycle preceding the influence.

In a particularly preferred specific embodiment, the operating behavior is ascertained in such a way that the motor vehicle has driving cycles beginning with the start and ending with the shutdown of the motor vehicle and the influence is a function of a predicted restart of the motor vehicle, the prediction of the restart occurring as a function of use conditions of the motor vehicle in previous driving cycles.

Preferably, the previous driving cycles are made up of at least two driving cycles, whose cyclical beginning, relating to a time of day and/or relating to a time difference between two consecutive driving cycles, does not exceed a predefined time difference.

In a particularly preferred specific embodiment, the influence occurs as a function of at least one second climate value, which represents the climate outside of the motor vehicle at the predicted restart. This is determined before the shutdown of the motor vehicle out of the driving cycle preceding the influence and/or between the shutdown of the motor vehicle out of the driving cycle preceding the influence and the predicted restart.

Preferably, the second climate value, which represents the climate outside of the motor vehicle at the predicted restart, is determined by read-out from external databases and/or by supplying appropriate data values using at least one data value transfer medium and/or by manual entry of the data values by a user of the motor vehicle.

Preferably, the operating behavior is ascertained in such a way that the influence is a function of at least one third climate value, which represents a predicted climate within the motor vehicle, the prediction of the third climate value occurring as a function of the use behavior of the motor vehicle in previous driving cycles.

In a particularly preferred specific embodiment, for influencing the climate in the interior of the motor vehicle, at least one measure is ascertained with the aid of data, which show, for example, if icing of the window of the motor vehicle may occur and/or if the temperature in the interior of the motor vehicle at the predicted restart does not reflect the temperature according to the use conditions of the motor vehicle in previous driving cycles. Moreover, the heat of the engine and/or of at least one battery present at the end of the previous driving cycle is utilized as a measure and/or at least one measure is already carried out before the end of the previous driving cycle, such as, for example, a heating of the interior of the motor vehicle and/or a reduction of the air humidity in the interior of the motor vehicle by an air exchange. Moreover, if in the case of a failed influence, it is not possible to achieve the predicted climate values in the interior of the motor vehicle, a notification originating from the motor vehicle may be transmitted.

According to the present invention, a device for influencing a climate in the interior of a motor vehicle is provided. The device furthermore includes means, with the aid of which the influence occurs at least as a function of one operating state and/or operating behavior of the motor vehicle ascertained before the influence.

Preferably, the device includes additional means, with the aid of which the operating state ascertained before the influence occurs as a function of the operating behavior of the motor vehicle.

In one particularly preferred specific embodiment, the device includes additional means, with the aid of which the operating state is ascertained in such a way that the motor vehicle has driving cycles beginning with the start and ending with the shutdown of the motor vehicle and the influence is at least a function of a first climate value ascertained by additional means, which represents the climate in the interior of the motor vehicle, this first climate value representing the climate in the interior of the motor vehicle during the driving cycle preceding the influence. Moreover, the operating behavior may be ascertained in such a way that the motor vehicle has driving cycles beginning with the start and ending with the shutdown of the motor vehicle and the influence is a function of a predicted restart of the motor vehicle, additional means being provided, with the aid of which the prediction of the restart occurs as a function of use conditions of the motor vehicle in previous driving cycles. Moreover, additional means are provided, with the aid of which the data relevant according to the present method may be stored and retrieved, and means are additionally provided, with the aid of which it is possible to send and receive messages.

Advantageous refinements of the present invention are described below.

BRIEF DESCRIPTION OF THE DRAWINGS

Exemplary embodiments of the present invention are represented in the figures and are explained in greater detail below.

DETAILED DESCRIPTION OF EXAMPLE EMBODIMENTS

Figure 1:
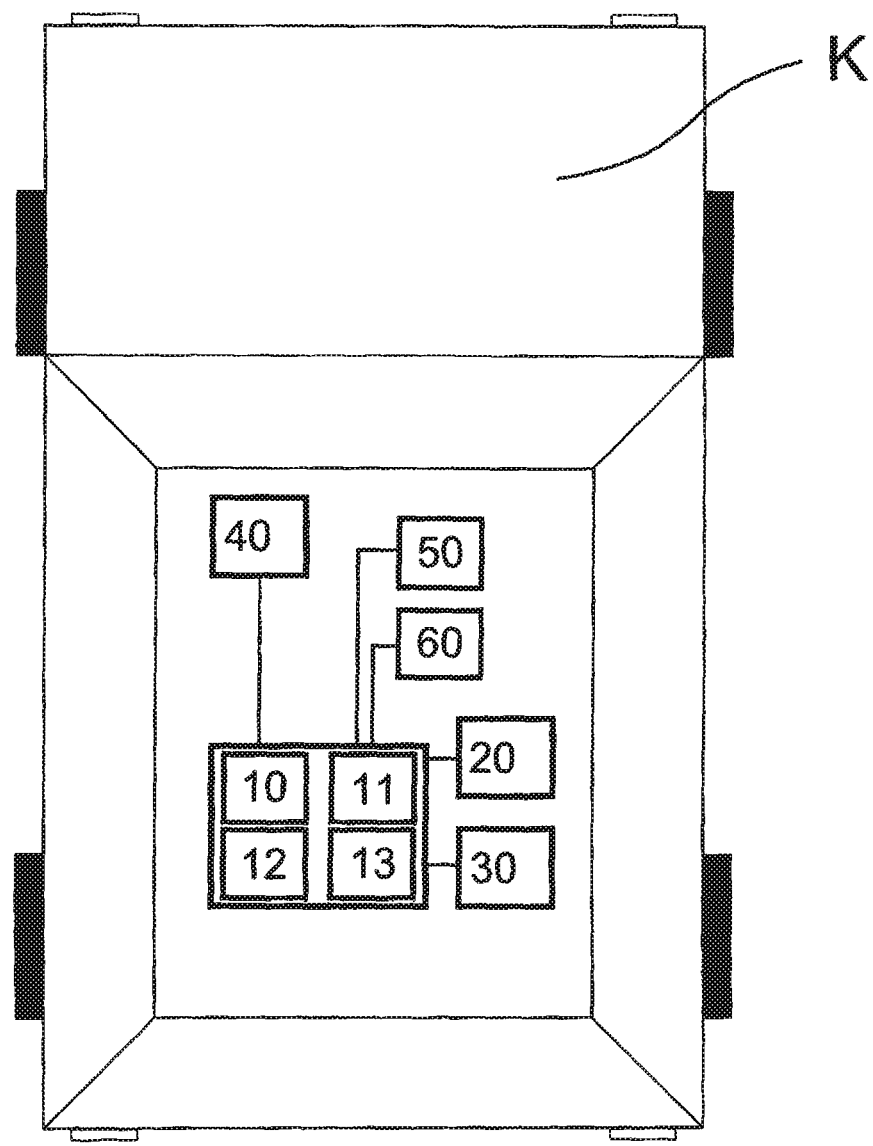
FIG. 1 shows one exemplary embodiment of a device according to the present method for influencing a climate in the interior of a motor vehicle, the influence occurring at least as a function of one operating state and/or operating behavior of the motor vehicle ascertained before the influence.

FIG. 1 shows a motor vehicle (K) as an example, which has, for example, means (10) for influencing the climate in the interior of motor vehicle (K) and additional means (11) with the aid of which the influence occurs at least as a function of an operating state and/or operating behavior of motor vehicle (K) ascertained before the influence, and with the aid of which the operating state ascertained before the influence occurs as a function of the operating behavior of motor vehicle (K). Furthermore, with the aid of these means (12), the operating state may be ascertained in such a way that motor vehicle (K) has driving cycles beginning with the start and ending with the shutdown of motor vehicle (K). Additional means (13) also make it possible to predict the restart as a function of use conditions of motor vehicle (K) in previous driving cycles.

In FIG. 1, means (20)/(30) are also apparent, for example, with the aid of which climate values, which represent the climate in the interior of motor vehicle (K), such as, for example, temperature (20) and/or air humidity (30), may be ascertained.

Furthermore, means (40) are apparent in FIG. 1, with the aid of which, consistent with the method according to the present invention, measures may be carried out for influencing the climate in the interior of motor vehicle (K).

Moreover, FIG. 1 shows, as an example, means (50), with the aid of which data may be stored and which may be read and evaluated according to the present invention. Here, this may also be, for example, a navigation system including appropriate possibilities for storage.

In addition, FIG. 1 shows, as an example, means (60) with the aid of which messages, for example, text messages or e-mails, may be sent and received and content from received messages may be processed accordingly, so that they may be used for influencing the climate in the interior of motor vehicle (K).

Figure 2:
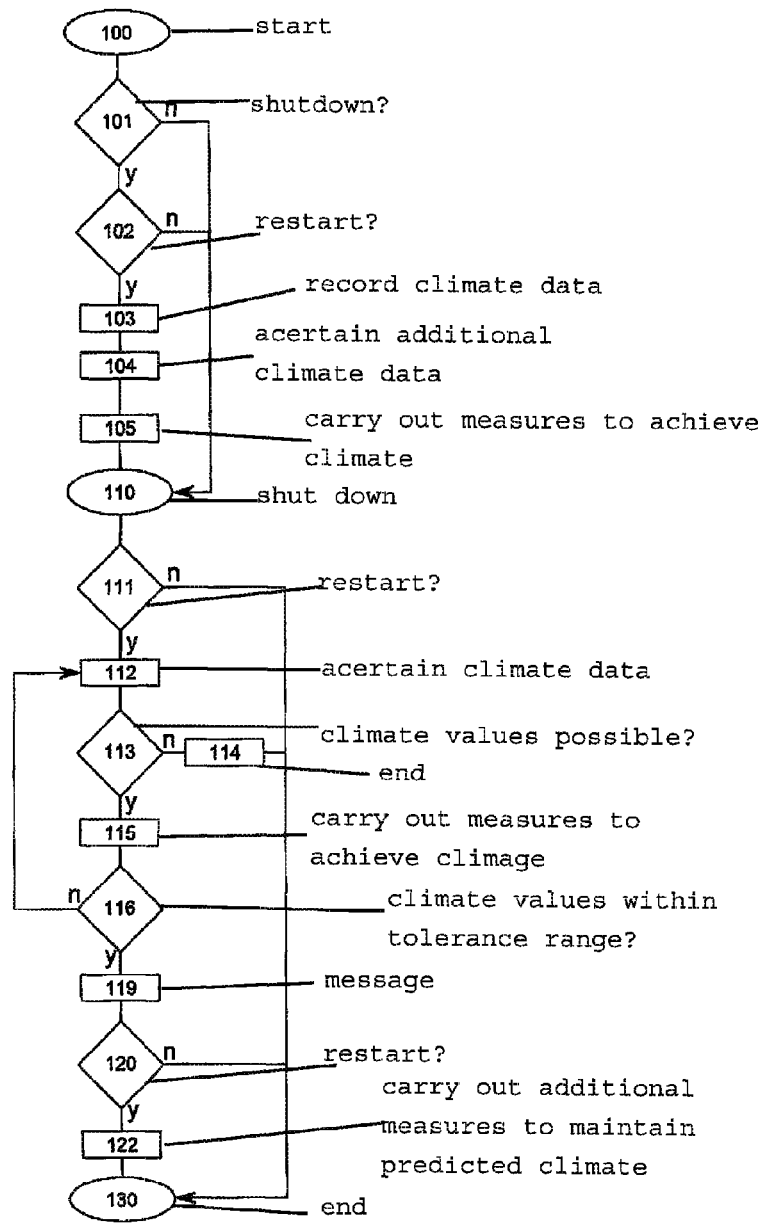
FIG. 2 shows one exemplary embodiment of a method according to the present invention for influencing a climate in the interior of a motor vehicle, the influence occurring at least as a function of one operating state and/or operating behavior of the motor vehicle ascertained before the influence.

One exemplary embodiment of the device according to the present invention is schematically shown in FIG. 2.

The method is started in step 100. This occurs as soon as motor vehicle (K) is put into operation.

In steps 101 and 102, it is ascertained whether a predicted shutdown (step 101) and a predicted restart after the shutdown of motor vehicle (K) (step 102) may be ascertained, for example, based on stored data from previous trips. For this purpose, previous trips are compared with one another with regard to the shutdown and the particular restart of motor vehicle (K) and, for example, evaluated for regularities with regard to repeating driving cycles. A regular utilization of motor vehicle (K) may be, for example, the travel of a driver of motor vehicle (K) to work, which is characterized by regularly repeating driving cycles, for example, including a trip in the morning and a trip in the afternoon, from Monday through Friday. If a predicted shutdown (step 101) may be ascertained, the ascertainment of a predicted restart (step 102) follows. Should it not be possible to ascertain either a predicted shutdown of motor vehicle (K) or a predicted restart of motor vehicle (K), according to the present method, a wait occurs until motor vehicle (K) is actually shut down and the method is continued with step 110. Should it be possible to ascertain both a predicted shutdown and a predicted restart, according to the present method, step 103 follows.

In step 103, climate data within motor vehicle (K), which represent, for example, the temperature and/or the air humidity and/or the air pressure, are recorded.

In step 104, additional climate data, which represent the climate at the predicted restart, are ascertained. Here, for example, temperature values and or air humidity values may also be ascertained. The ascertainment of the values may, for example, occur via the read-out of at least one already stored value from a memory medium, which is, for example, part of motor vehicle (K), and/or, for example, also by radio transmission from climate value databases and/or by manual entry by a driver of motor vehicle (K), into, for example, a database and/or a navigation system of motor vehicle (K). However, the data may, for example, also be transferred via a data value transfer medium into an appropriate database, which is, for example, part of motor vehicle (K). In principle, this memory medium may also be a navigation system. The ascertainment of the values may be repeated in regular, predefined intervals and/or intervals desired by at least one driver of motor vehicle (K), for example, after 30 minutes in each case.

Consistent with the predicted climate values, which represent the climate at the predicted restart, measures are carried out in step 105 to achieve a climate consistent with the predicted climate values. In this case, the measures should be selected in such a way that the measures may be carried out after the shutdown of motor vehicle (K), if possible, as efficiently as possible. Efficiency may be understood to be, for example, carrying out the measures using very little consumption of energy, for example, a battery and/or other energy source, and/or acting so efficiently with regard to time that the climate is reached as rapidly as possible at the predicted restart. This may, for example, be necessary if only a few hours, for example, one to two hours, lie between the predicted shutdown and the predicted restart. The measures may, for example, also be a function of the predicted operating state at the predicted restart. For example, in winter the windows may ice over in such a way that a driver of motor vehicle (K) does not have adequate visibility for a safe utilization of motor vehicle (K), nor are sensors, for example, video sensors, capable of fulfilling their functions. In this case, for example, at least one measure for increasing the temperature within motor vehicle (K) could be carried out before the shutdown and/or at least one measure could be carried out for reducing the air humidity in the interior of motor vehicle (K). In summer, the temperature within motor vehicle (K) may, for example, be too high at the predicted restart to make focused driving possible and/or the temperature deviates strongly, for example, by more than 3° C., from the predicted temperature according to an operating behavior of motor vehicle (K) at the predicted restart. In this case, at least one measure could also be carried out to effectuate an appropriate influence of the climate values within motor vehicle (K) already before the shutdown of motor vehicle (K), such as, for example, a reduction of the air humidity by an air exchange.

Motor vehicle (K) is shut down in step 110.

In step 111, after the shutdown of motor vehicle (K), it is ascertained if it is possible to ascertain a predicted restart. This occurs even if it was not possible to ascertain a predicted restart in step 102. After motor vehicle (K) is shut down and the information is present concerning the exact point in time of the shutdown, this may, for example, still be possible. Should a predicted restart have already been ascertained in step 102, the point in time after the actual shutdown of motor vehicle (K) may be updated. If it was not possible to ascertain a predicted restart, the method continues with step 130 and the cycle of the method according to the present invention is ended. If it is possible to ascertain a predicted restart, step 112 follows.

In step 112, climate data, which represent the climate at the predicted restart, are ascertained, the approach corresponds to the method according to step 104, and step 113 follows.

In step 113, it is checked if the predicted climate values, which represent the climate at the predicted restart within motor vehicle (K), for example, a temperature desired by a driver of motor vehicle (K) at the predicted restart, is at all possible with the aid of at least one measure according to the present method for influencing the climate values which represent the climate within motor vehicle (K). If, according to the present method, no measures are available for the influence, the method is ended and step 114 follows. If measures for influencing the climate values, which represent the climate within motor vehicle (K), are present in order to provide the predicted climate values at the predicted restart, step 115 follows.

In step 114, a message, for example, a text message or e-mail, is transmitted, for example, to the mobile phone or the e-mail address of the driver at the predicted restart, in order to inform the driver that it is not possible to influence the climate values for making a predicted climate possible at the predicted restart. This may, for example, be the case if only a short time span, for example, 15 minutes or less, lies between the shutdown of motor vehicle (K) and the predicted restart, which is not adequate for carrying out an adequate influence of the climate values using measures according to the present method.

As a function of the predicted climate values at the predicted restart and/or as a function of the predicted use behavior of at least one driver of motor vehicle (K) at the predicted restart, measures for influencing the climate are carried out in step 115 in such a way that the climate within motor vehicle (K) is reached at the predicted restart of motor vehicle (K), consistent with the predicted climate values. For this purpose, for example, the heat still present after the shutdown, for example from the engine and/or of at least one battery, may be utilized for heating the interior of motor vehicle (K). The same heat may also be used, for example, for reducing the air humidity. As at least one additional measure, at least as a function of at least one climate value which represents the climate within motor vehicle (K) and/or as a function of at least one additional climate value, which represents the climate outside of motor vehicle (K), an air exchange may be carried out between the interior of motor vehicle (K) and the surroundings of motor vehicle (K) on a one time basis and/or regularly. Step 116 follows.

In step 116, it is checked whether the climate values influenced by the measures of step 105 and step 115, which represent the climate at the predicted restart, lie within a predefined tolerance range, which, for example, with regard to a predicted temperature, may lie within a temperature range of 2° C. and/or in winter may lie, for example, at at least +5° C. for preventing the icing over of the windows of motor vehicle (K). If the climate values, which represent the climate within motor vehicle (K) at the predicted restart, lie within a predefined tolerance and no additional measures must be carried out until the predicted restart, since, for example, the time until the predicted restart amounts to less than a predefined time difference, which may, for example, be less than 30 minutes, step 120 follows. If additional measures are necessary, so that the climate values lie within the tolerance range at the predicted restart and/or the time span until the predicted restart is too large, so that the climate values lie within the tolerance range at the predicted restart, step 112 follows.

In step 119, a message, for example, a text message or e-mail, is transmitted optionally to, for example, the mobile phone or the e-mail address of the driver at the predicted restart, in order to inform the driver that an influence of the climate values was carried out in such a way that the climate values, which represent the instantaneous climate within motor vehicle (K), within a predefined tolerance range, are consistent with the climate values, which represent the climate at the predicted restart.

In step 120, it is checked whether the predicted restart actually takes place. In this case, it may be, for example, checked whether a restart is carried out within a predefined time interval, within which the predicted restart should occur. If no restart occurs within this time interval, which may amount to, for example, 30 minutes, the method is ended and step 130 follows. If the predicted restart takes place within the predefined time interval, step 122 follows.

In step 122, additional measures are carried out in order to maintain the predicted climate at the predicted restart, even after the restart. These may, for example, be automatic regulations of the temperature and/or the air humidity, as was already described in steps 105 and 115.

In step 130, the method is ended, for example, after a driver of motor vehicle (K) has reached the destination, for example, the driver's workplace.

Of course, additional exemplary embodiments and hybrid forms of the presented examples are possible.

What is claimed is:

1. A method for influencing a climate in the interior of a motor vehicle, comprising:
    influencing the climate in the interior of the motor vehicle at least as a function of at least one of: i) an operating state of the motor vehicle ascertained before the influence, or ii) an operating behavior of the motor vehicle ascertained before the influence.

2. The method as recited in claim 1, wherein the operating state ascertained before the influence occurs as a function of the operating behavior of the motor vehicle.

3. The method as recited in claim 1, wherein the operating state is ascertained in such a way that the motor vehicle has driving cycles beginning with a start of the motor vehicle and ending with a shutdown of the motor vehicle, and the influence occurs at least as a function of at least one first climate value representing a climate in the interior of a motor vehicle, the first climate value representing the climate in the interior of the motor vehicle during a driving cycle preceding the influence.

4. The method as recited in claim 1, wherein the operating behavior is ascertained in such a way that the motor vehicle has driving cycles beginning with a start of the motor vehicle and ending with a shutdown of the motor vehicle, and the influence is a function of a predicted restart of the motor vehicle, the prediction of the restart occurring as a function of use conditions of the motor vehicle in previous driving cycles.

5. The method as recited in claim 4, wherein the previous driving cycles are made up of at least two driving cycles, whose cyclical beginning, at least one of relating to a time of day and relating to a time difference between two consecutive driving cycles, does not exceed a predefined time difference.

6. The method as recited in claim 4, wherein the influence occurs as a function of at least one second climate value, which represents a climate outside of the motor vehicle at the predicted restart, and the influence is determined at least one of: i) before the shutdown of the motor vehicle out of the driving cycle preceding the influence, or ii) between the shutdown of the motor vehicle out of the driving cycle preceding the influence and the predicted restart.

7. The method as recited in claim 6, wherein the second climate value, which represents the climate outside of the motor vehicle at the predicted restart, is determined at least one of: i) by read-out from external databases, ii) by supplying appropriate data values using at least one non-transitory data value transfer medium, or iii) by manual entry of data values by a user of the motor vehicle.

8. The method as recited in claim 1, wherein the operating behavior is ascertained in such a way that the influence is a function of at least one third climate value, which represents a predicted climate within the motor vehicle, the third climate value being a function of a use behavior of the motor vehicle in previous driving cycles.

9. The method as recited in claim 1, wherein, for influencing the climate in the interior of the motor vehicle, at least one of: i) at least one measure is ascertained with aid of data, regarding at least one of whether icing over of a window of the motor vehicle may occur or whether a temperature in the interior of the motor vehicle at a predicted restart does not reflect a temperature according to use conditions of the motor vehicle in previous driving cycles or heat of an engine, ii) at least one battery present at an end of the previous driving cycle is utilized as a measure, iii) at least one measure is already carried out before an end of the previous driving cycle, or iv) a reduction of air humidity in the interior of the motor vehicle by an air exchange is carried out, and wherein if in the case of a failed influence, it is not possible to achieve predicted climate values in the interior of the motor vehicle, a notification originating from the motor vehicle is transmitted.

10. A device for influencing a climate in the interior of a motor vehicle, the device configured to influence the climate as a function of at least one of: i) an operating state of the motor vehicle ascertained before the influence, or ii) an operating behavior of the motor vehicle ascertained before the influence.

11. The device as recited in claim 10, further configured to ascertain the operating state before the influence occurs as a function of the operating behavior of the motor vehicle.

12. The device as recited in claim 10, further configured to ascertain at least one of: i) the operating state in such a way that the motor vehicle has driving cycles beginning with a start of the motor vehicle and ending with a shutdown of the motor vehicle, and the influence occurs at least as a function of a first climate value also ascertained, which represents a climate in the interior of the motor vehicle, this first climate value representing the climate in the interior of the motor vehicle during the driving cycle preceding the influence, or ii) the operating behavior in such a way that the motor vehicle has driving cycles, beginning with the start and ending with the shutdown of the motor vehicle, and the influence is a function of a predicted restart of the motor vehicle, and wherein predicting the restart occurs as a function of use conditions of the motor vehicle in previous driving cycles;
    store and retrieve data relevant to the method; and
    send and receive messages.

* * * * *